Patented Nov. 14, 1939

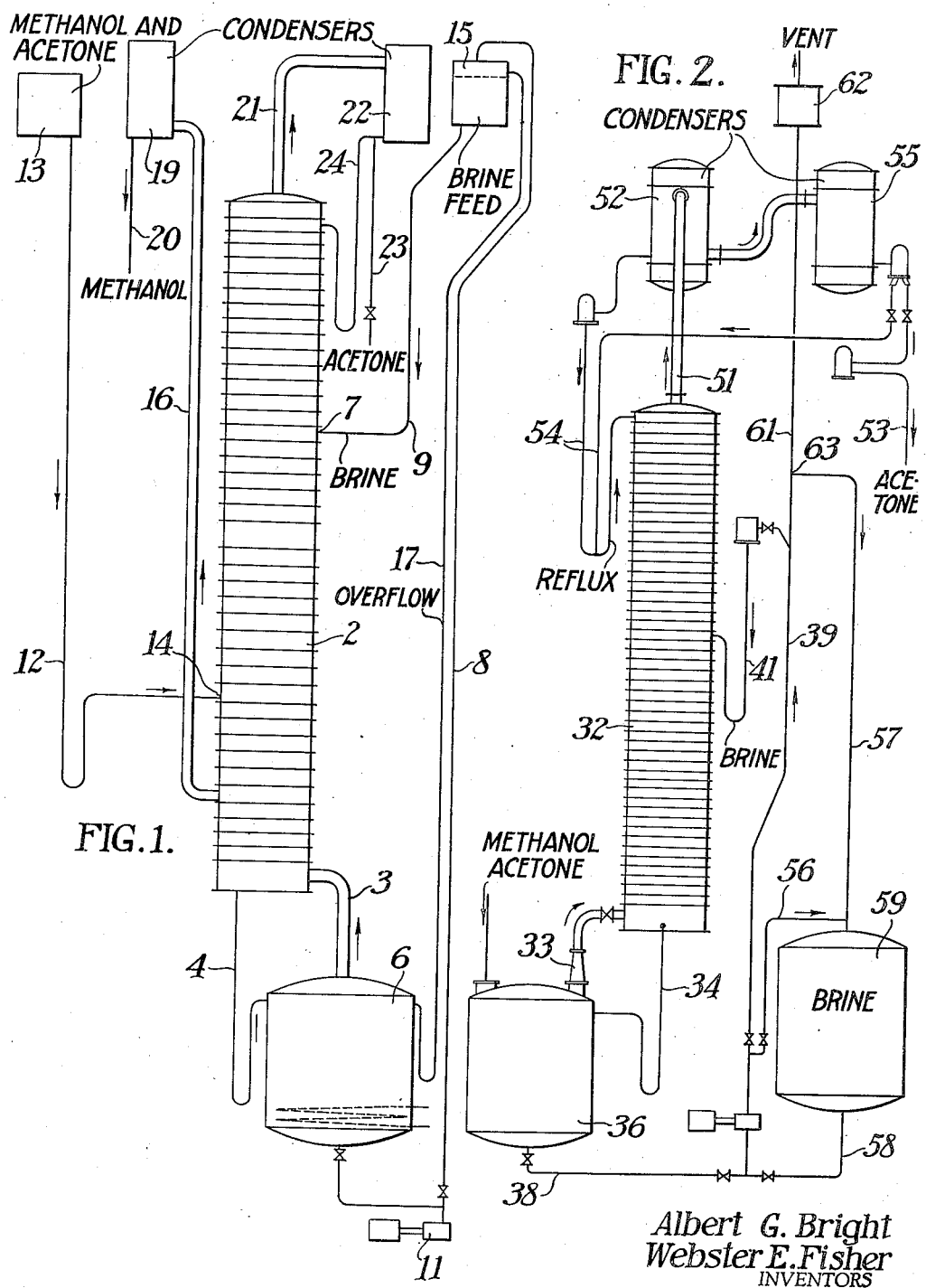

2,179,991

UNITED STATES PATENT OFFICE 2,179,991

PROCESS FOR THE SEPARATION OF METHANOL AND ACETONE MIXTURES

Albert G. Bright and Webster E. Fisher, Rochester, N. Y., assignors to Eastman Kodak Company, Rochester, N. Y., a corporation of New Jersey Application January 9, 1937, Serial No. 119,820

9 Claims. (Cl. 202—56)

This invention relates to methods for the separation of mixtures, and more particularly to separation of mixtures containing methanol and acetone.

It is well known, as pointed out in Hawley U. S. Patent 1,106,707 and Barbet U. S. Patent 1,805,559, that methanol and acetone mixtures cannot be separated by distillation, because methanol and acetone form a constant boiling mixture. Consequently a number of methods have been suggested in the art for overcoming this difficulty.

For example, it has been proposed to employ either sodium hydroxide or potassium carbonate to hold back the methanol. The use of potassium carbonate, for example, is in some respects precluded because of its cost, and furthermore any alkaline material of this type catalyzes the polymerization of acetone. Aside from these disadvantages, a process of this type is not satisfactory for use in the recovery of acetone which may be subsequently employed in the manufacture of photographic materials and other such uses, because the action of alkali leads to the formation of unsaturated bodies which will fog a light-sensitive photographic emulsion.

It has also been suggested to employ an aqueous solution of sodium thiosulfate in the separation of methanol and acetone mixtures. Likewise, acetone from such a process would not be satisfactory for many purposes. The slightest traces of sulfur in acetone employed for photographic purposes would fog emulsions and otherwise interfere with products employing this source of acetone.

It has also been suggested to treat methanol-acetone mixtures with solid (anhydrous) calcium chloride. The use of solid calcium chloride is not only difficult, but would be costly. Furthermore, one would be limited to batch operation.

We have found a procedure whereby methanol-acetone mixtures may be readily separated by either batch or continuous operation. The acetone obtained is of high purity and subject to none of the aforementioned undesirable qualities.

A more complete understanding of our invention may be had by reference to the accompanying drawing forming a part of the present application.

Figure 1 is a diagrammatic side elevation view of one form of apparatus arrangement which may be employed in the continuous operation of our process.

Figure 2 is a semi-diagrammatic side elevation view of another apparatus arrangement which may be employed in carrying out our process.

In Figure 1, 2 represents a column which may be of the usual bubble plate type employed in distillation, or it may be of the type used in the industry for various countercurrent treatments. The lower portion of the column is connected by conduits 3 and 4 to a base heater 6.

Base heater 6 is also connected to an intermediate section of the column as at 7, by means of conduits 8 and 9. Suitable pumps or other devices may be interspersed as at 11 and 15. Another conduit 12, leading from feed tank 13, joins a column at another intermediate point 14.

Also at some intermediate point there may be provided the tap off conduit 16 which leads to a condenser or other cooling device 19.

The upper portion of column 2 is connected by means of vapor take-off conduit 21 through condenser 22 to the several draw-off and reflux lines 23 and 24. An overflow line is provided at 17 for brine.

In Figure 2, 32 represents a column of the type already described with respect to Figure 1. This column is connected to a base heater or still pot 36 by means of conduits 33 and 34.

The lower portion of the still pot may be connected to an intermediate section of the column by means of conduits 38, 39 and 41. Pumps or other means for causing liquid flow may be employed where necessary. The upper portion of the column is provided with vapor outlet 51, condensers 52 and 55, and reflux and draw-off line 53 and 54, as already described with respect to Figure 1.

In the arrangement of Figure 2, however, an external circulation system comprising conduits 56, 57, and 58 and tank 59 is provided for handling the solution used for separating, the aforementioned conduits being connected to conduits 38 and 39. A vent means comprising conduit 61 and vapor separator 62 is attached to the system at 63.

It is understood, with respect to both the system of Figure 1 and Figure 2, that valves, sight glasses and other similar devices may be employed in the conduit connections and at other points in the system where desired.

The operation of the apparatus described in Figures 1 and 2, as well as a more complete understanding of our novel process may be had from a consideration of the following examples which are set forth for the purpose of illustration and disclosure of our preferred embodiments.

Assuming that a mixture comprising about 80% acetone, 15% methanol and 5% water was to be separated, and the continuous apparatus of Figure 1 was to be employed, the following procedure may be followed: Base heater 6 may contain an aqueous brine, such as aqueous calcium chloride solution. It is desired to emphasize at this point that our use of aqueous calcium chloride is for separation purposes. In many instances in the prior art it will be noted that calcium chloride is employed for dehydrating, and under such conditions generally is initially in an anhydrous and substantially solid state. Our brine solution may contain considerable water in order to render it capable of being pumped because we are not primarily employing the dehydrating property of calcium chloride. This brine in base heater 6 may be introduced for the purpose of starting the process, or, if the process has been in operation, the brine will have collected in base heater 6.

The mixture of acetone, alcohol and water to be separated is fed from storage tank 13 through conduit 12 into the column 2 at some intermediate point 14, usually in the lower half or third of the column. At some point in the column 7 above the methanol-acetone feed, the aqueous brine is fed in, such as by pumping from base heater 6 through conduits 8 and 9. If desired, a gravity feed brine tank may be positioned so that the brine may be fed into column 2 by gravity as from 15.

Heat would be supplied to base heater 6 in a closed coil in a manner similar to conventional distillation processes, and this would cause the feed mixture entering at 14 to flow upwardly in the column, thereby meeting the aqueous brine solution in counter-current contact. The brine solution, upon contacting the methanol-acetone mixture, probably forms some type of a loose chemical combination with the methanol and permits the acetone to pass upwardly in the column, thereby producing separation.

The acetone which passes on, should it contain some water, may be rectified in the upper portion of column 2 for the elimination of this water, and the purified acetone vapors withdrawn through conduit 21, then through 22 and conduit 23 to storage or other use. A portion of the condensed acetone may be returned as reflux to conduit 24, in order to carry out rectification.

The methanol which has been separated from the acetone by the brine solution flows down the column toward the base heater 6. As previously pointed out, heat has been supplied to 6, and at the temperatures prevailing in the lower part of the column any chemical combination between brine-methanol is destroyed. The methanol becomes vaporized through conduit 3 up into column 2. By tapping into the lower third of the column, such as 16, these methanol vapors, together with some water, may be withdrawn through 16. The vapors of methanol may be finally conducted through conduit 16, condenser 19, and recovered at 20.

The brine in 6 from which the methanol has been separated may be withdrawn through conduits 8 and 9, and again recycled through the system by feeding into column 2 at 7, as already described. It is, therefore, apparent that the process having been started and the feed at 14 adjusted, our process may operate substantially continuously for a considerable length of time.

For a further understanding of our invention, reference may be had in particular to Figure 2 in carrying out the procedure of the following example. The still pot 36 was charged with the methanol-acetone mixture to be treated. Heat was applied to the still pot and as the methanol-acetone vapors ascended column 32, aqueous brine solution from the external storage tank 59 was pumped into the column at an intermediate point. For example, when employing a 50-plate column, the brine may be supplied at about the 28th plate from the bottom. With an apparatus arrangement of this type, the distillate may be removed from the head of the column through condensers 52 and 55 at the rate of about 500 gallons per hour. The brine was added at about the same rate as the distillate was removed.

The counter-current treatment in column 32 was as described with respect to Figure 1. The methanol was separated from the mixture and carried down into still pot 36. The upper part of the column removed water from the acetone.

A thermocouple device in the upper third of the column may be used to control the column's operation. When this couple records a temperature break, it indicates that all the acetone has been removed and that methanol and water are beginning to arrive in the upper part of the column. At this point, an intermediate fraction was collected until a top temperature of about 148° F. was reached, whereupon pure methanol was collected.

After complete removal of the methanol, the temperature rises to about 212° F. Heat to the still pot was then shut off and the column permitted to drain. In order to facilitate drainage in any of the apparatus we have shown, the plate may have small holes drilled therein so that drainage will be complete.

The residue in still pot 36 comprised brine which had been freed of methanol and some water. This brine was then pumped back to tank 59 where it was ready for reuse.

From the above examples it is apparent that we have provided simple and inexpensive procedure for the separation of methanol-acetone mixtures. The procedure set forth above may be varied somewhat. We have found that the use of a very concentrated solution of calcium chloride and water can be employed and that an acetone of very high purity will be obtained. Our process has none of the disadvantages referred to in the discussion of prior art processes and possesses several distinctive features of its own. It will be noted that our method includes the counter-current treatment of the methanol-acetone vapors as they ascend a column, with a brine solution preferably a calcium chloride brine of specific gravity about 1.4. This brine so reduces the vapor pressure of the methanol, or otherwise acts upon the methanol that the acetone can be removed from the top of the column with ease. Our process possesses a number of advantages. Our process is economical. The cost of the brine employed is insignificant in comparison with various costs, such as the cost of recovering solid calcium chloride. Furthermore, in our process there is little, if any, loss of material. Our procedure for recovering the brine is so simple that very little expense is involved.

The simplicity of the operation of our process is manifest. The treatment of the type we have described is one of the most efficient attainable, and offers the advantage of lending itself to continuous operation.

The methanol-acetone mixtures treated are not affected chemically by the brine. It is possible, by means of our invention, to recover acetone whose purity is greater than 99.5%. This is of considerable importance, inasmuch as acetone of very high purity is required in many industrial processes. For example, our acetone is of sufficiently high purity that it may be employed in the manufacture of safety film and other photographic products.

Although we have shown and described certain specific embodiments of our invention, we are fully aware that many modifications thereof are possible. Our invention, therefore, is not to be restricted except insofar as is necessitated by the prior art and by the spirit of the appended claims.

What we claim is:

1. A continuous process for the separation of methanol and acetone, which comprises contacting a mixture containing methanol and acetone with brine in a heated distillation unit whereby acetone is caused to pass upwardly in the unit and methanol and brine downwardly, subjecting the brine to distillation in the lower part of the unit for distilling off methanol, and recirculating the demethanolized brine in contact with the methanol and acetone mixture to be separated.

2. A process for separation of methanol-acetone mixtures, which comprises charging a column with a methanol-acetone mixture to be treated, vaporizing the methanol-acetone mixture, contacting the vapors with an aqueous brine solution, whereby acetone is recovered at the head of the column and methanol and brine at the base of the column.

3. A process for separating acetone-methanol mixtures, which comprises charging a column with a methanol-acetone mixture to be treated, vaporizing the methanol-acetone mixture, contacting the vapors with an aqueous brine solution having a preferential affinity for methanol, recovering acetone at the head of the column and a methanol-brine mixture at the base of the column, and at least partially separating the methanol from the brine solution.

4. A continuous process for the separation of methanol and acetone, which comprises contacting a mixture of methanol and acetone with a brine solution in a heated column, withdrawing acetone substantially free of methanol from the head of the column, conducting brine and methanol to the base of the column, distilling methanol from the brine, and withdrawing methanol from an intermediate section of the column.

5. A continuous process for the separation of methanol and acetone mixtures which comprises contacting a mixture containing methanol and acetone with calcium chloride brine in a heated column, whereby acetone is caused to pass upwardly in the column and methanol and brine downwardly in the column, subjecting the brine to heat in the lower part of the column for distilling off the methanol, withdrawing methanol from the side of the column, and recirculating brine in contact with the methanol and acetone mixture to be separated.

6. A process for the separation of methanol-acetone mixtures, which comprises vaporizing a methanol-acetone mixture to be separated, contacting the vapors with a brine solution so as to wash out said methanol, said solution containing calcium chloride and having a preferential affinity for methanol, observing the temperature of operation, and continuing the brine contact until a temperature break, as respects the acetone constituent, occurs.

7. A continuous process for the separation of methanol and acetone, which comprises continuously contacting a mixture of methanol and acetone undergoing distillation to produce some methanol vapor, with a brine solution introduced into a distillation apparatus above said methanol vapors so as to wash down methanol, withdrawing acetone substantially free of methanol from the distillation apparatus, conducting brine and the washed down methanol to the lower part of the apparatus and at least partially separating the brine and methanol.

8. A process for the separation of methanol-acetone mixtures, which comprises charging a distillation system with the methanol-acetone mixture to be treated, heating the methanol acetone mixture to generate methanol and acetone vapors, contacting the vapors with an aqueous calcium chloride brine solution flowing countercurrent to said vapors so as to form a loose chemical combination between the brine and the methanol and subjecting the resultant combination of brine and methanol to a distilling treatment for recovering the methanol therefrom.

9. In a continuous process for obtaining substantially pure acetone from acetone-methanol mixtures, the steps which comprise contacting a methanol-acetone mixture including methanol and acetone vapors with a brine solution introduced above and flowing countercurrent to said vapors, said solution taking up the methanol in preference to the acetone, withdrawing and condensing acetone vapors and heating the resultant mixture of methanol and brine to separate the methanol therefrom.

ALBERT G. BRIGHT.
WEBSTER E. FISHER.